United States Patent [19]
Hale et al.

[11] Patent Number: 5,991,687
[45] Date of Patent: Nov. 23, 1999

[54] SYSTEM AND METHOD FOR COMMUNICATING INFORMATION RELATED TO A GEOGRAPHICAL AREA

[75] Inventors: George H. Hale, Naperville; Andrew P. Milleville, Westmont; Alan D. Berger, Winfield, all of Ill.

[73] Assignee: Case Corporation, Racine, Wis.

[21] Appl. No.: 08/887,484

[22] Filed: Jul. 2, 1997

[51] Int. Cl.⁶ .................................................. G01C 21/02
[52] U.S. Cl. ........................... 701/207; 701/213; 701/50; 342/357.09
[58] Field of Search .............................. 701/50, 208, 213, 701/215; 340/995; 342/457, 357.09, 357.17; 702/5

[56] References Cited

U.S. PATENT DOCUMENTS

| | | | |
|---|---|---|---|
| 5,153,598 | 10/1992 | Alves, Jr. ................................. | 342/352 |
| 5,526,002 | 6/1996 | Gudat et al. ............................. | 342/457 |
| 5,699,244 | 12/1997 | Clark, Jr. et al. ......................... | 702/2 |
| 5,704,546 | 1/1998 | Henderson et al. ....................... | 239/1 |
| 5,712,782 | 1/1998 | Weigelt et al. ............................ | 701/50 |
| 5,721,679 | 2/1998 | Monson .................................... | 701/50 |
| 5,754,137 | 5/1998 | Durrstein ................................. | 342/357 |
| 5,764,139 | 6/1998 | Nojima et al. ........................... | 340/461 |

FOREIGN PATENT DOCUMENTS

| | | |
|---|---|---|
| 43 42 171 A 1 | 5/1994 | Germany . |
| 43 22 293 A 1 | 1/1995 | Germany . |
| 2 304 910 | 3/1997 | United Kingdom . |
| WO 95/02318 | 1/1995 | WIPO . |
| WO 95/15499 | 6/1995 | WIPO . |
| WO 95/31759 | 11/1995 | WIPO . |
| WO 98/21926 | 5/1998 | WIPO . |
| WO 98/21930 | 5/1998 | WIPO . |

*Primary Examiner*—Michael J. Zanelli
*Attorney, Agent, or Firm*—Foley & Lardner

[57] ABSTRACT

A system for communicating information relating to a geographical area includes a circuit for determining the location of a vehicle within a geographical area and for receiving and processing message information relevant to the geographical area. The system further includes a communication device for communicating both the location and message information to an operator of the vehicle. The location and message information may be further correlated with characteristics sampled at various locations within the geographical area.

71 Claims, 2 Drawing Sheets

SYSTEM AND METHOD FOR COMMUNICATING INFORMATION RELATED TO A GEOGRAPHICAL AREA

FIELD OF THE INVENTION

The present invention relates generally to communicating information related to a geographical area. In particular, the invention relates to a system and method for receiving location and message information related to a geographical area over which a vehicle is moving. The location and message information is communicated to an operator of the vehicle via a communication device, such as an electronic display.

BACKGROUND OF THE INVENTION

The advent of publicly available global-positioning-satellite technology (GPS) has transformed such industries as agriculture and construction into high-tech, precision operations. By offering advantages, such as cost control and enhanced performance, GPS-based systems have become attractive tools for agricultural and construction operations.

GPS systems obtain location information from a system of satellites orbiting about the earth. The satellites transmit electromagnetic signals from which the location of a GPS receiver located on or near the earth's surface can be determined. Presently, civilian GPS signals provide location information having an accuracy limited to approximately fifty meters. However, various available technologies, such as differential GPS signals, used in conjunction with GPS, can greatly increase accuracy.

For agricultural applications, the highly accurate GPS technology allows the large-scale farmer to micromanage his fields. For example, existing farming systems employing GPS permit farmers to accurately map grain yield within a field or to pinpoint problems, such as weeds, drainage or soil characteristics. However, these systems receive location information only, which is then combined, and often displayed, with data collected within the geographical area.

In addition to combining GPS location data with collected data, farming and construction operations could function even more advantageously by combining the GPS data with data received from external sources that also is related to the geographical area. For example, a farmer working in his field could profit from receiving an up-to-date weather map that may indicate the need to deviate from a planned prescription. Or, a farmer monitoring crop quality and yield could make investment decisions based on receiving contemporaneous commodities reports. In a construction operation, the vehicle operator could receive precise instructions regarding site-specific dig depth or grading requirements. A need exists, therefore, for a system that communicates information related to a geographical area to an operator of a vehicle moving within the area. Accordingly, it would be desirable to provide a system which receives information, which includes both location and message information, from external sources.

SUMMARY OF THE INVENTION

A first embodiment of the present invention provides a system for communicating information related to a geographical area. The system includes a vehicle moveable over the geographical area, a receiver supported by the vehicle which receives a communication signal including a location signal and a message signal, and a data generator coupled to the receiver. The data generator generates location data representing locations of the vehicle within the geographical area and message data representing message information related to the geographical area for communication to an operator housed in the vehicle. A data processor is coupled to the data generator and includes a display control circuit to generate display signals based on the location and message data. An electronic display coupled to the display control circuit generates visible indicia representative of the locations of the vehicle and the message information.

Another embodiment of the system includes a receiver supported by the vehicle which receives a location signal from a plurality of satellites as well as a message signal. A data generator generates location data representative of locations of the vehicle within a geographical area and message data representative of message information related to the area. Display signals generated by a display control circuit included in a data processor are based on the location and message data and are coupled to an electronic display. The display generates visible indicia representative of the vehicle locations and the message information.

In a further embodiment of the system, the receiver receives a location signal from a plurality of satellites as well as message and correction signals. The data generator generates the location data based on combining the location and correction signals, and generates message data based on the message signal. A display control circuit, included within the data processor, generates display signals based on the location and message data which are coupled to an electronic display. In response, visible indicia representative of the vehicle locations and the message information are generated by the display. In an alternative embodiment, the display signals are coupled to a communication device which generates indicia representative of the vehicle locations and the message information.

A further embodiment of the system includes receiving means for receiving a location signal from a plurality of satellites and message and correction signals. The system further includes data generating means for generating location data representative of vehicle locations by combining the location and correction signals, and for generating message data based on the message signal. Processing means for processing the data includes control means for generating control signals based on the data. The system also includes communication means for generating indicia representative of the vehicle locations and the message information.

Another embodiment of the invention provides a method for communicating location and message information related to a geographical area to an operator housed in a vehicle. The method includes the steps of moving the vehicle over the geographical area, receiving a location signal from a plurality of satellites and correction and message signals. Location data is generated by combining the location and correction signals. Message data is generated from the message signal. Control signals based on the location and message data are provided to generate a communication which is perceptible to the vehicle operator and representative of the vehicle locations and message information.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
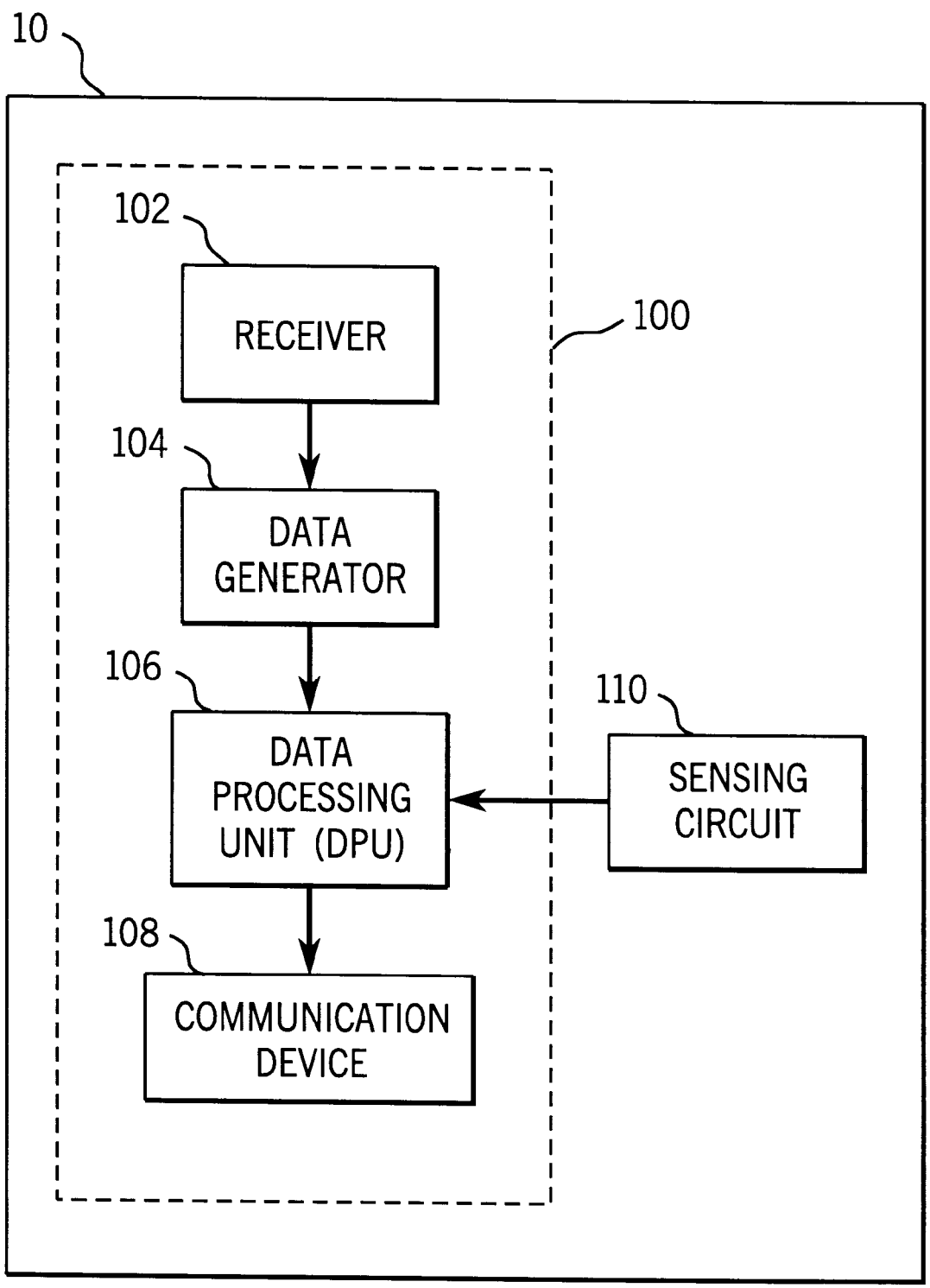
FIG. 1 is a block diagram illustrating a system for communicating information related to a geographical area via a communication device located in a vehicle.

Referring to FIG. 1, a block diagram of a vehicle 10 including a communication system 100 for communicating information related to a geographical area via a communication device is illustrated. Communication system 100 includes a receiver 102, a data generator 104, a data processing unit (DPU) 106, and a communication device 108. Receiver 102 may receive location and message information from a variety of sources, such as satellites or local transmitters, that is related to the area over which vehicle 10 is moving. The location signal is used to identify the position of vehicle 10 within the area. The message signal provides information related to the area to a vehicle operator. Both the location and message information are communicated to the vehicle operator via communication device 108.

Data generator 104 generates location and message data based on the received signals. DPU 106 processes the data and provides control signals to communication device 108 to communicate the information visually and/or audibly to the vehicle operator. Communication device 108 preferably is an alphanumeric and graphical display, such as a CRT or a flat screen liquid crystal display, but may also display only alphanumerics or graphics. Alternatively, device 108 may be a speaker, a visible or audible alarm or other type of sensible communication device or a combination of such devices. In addition, vehicle 10 may also include a sensing circuit 110, coupled to communication system 100, that senses or monitors site-specific characteristics as vehicle 10 traverses the geographical area. DPU 106 processes the characteristic data collected by sensing circuit 110 and correlates the data with the location and message data. Device 108 communicates the characteristic information in combination with the location and message information.

Figure 2:
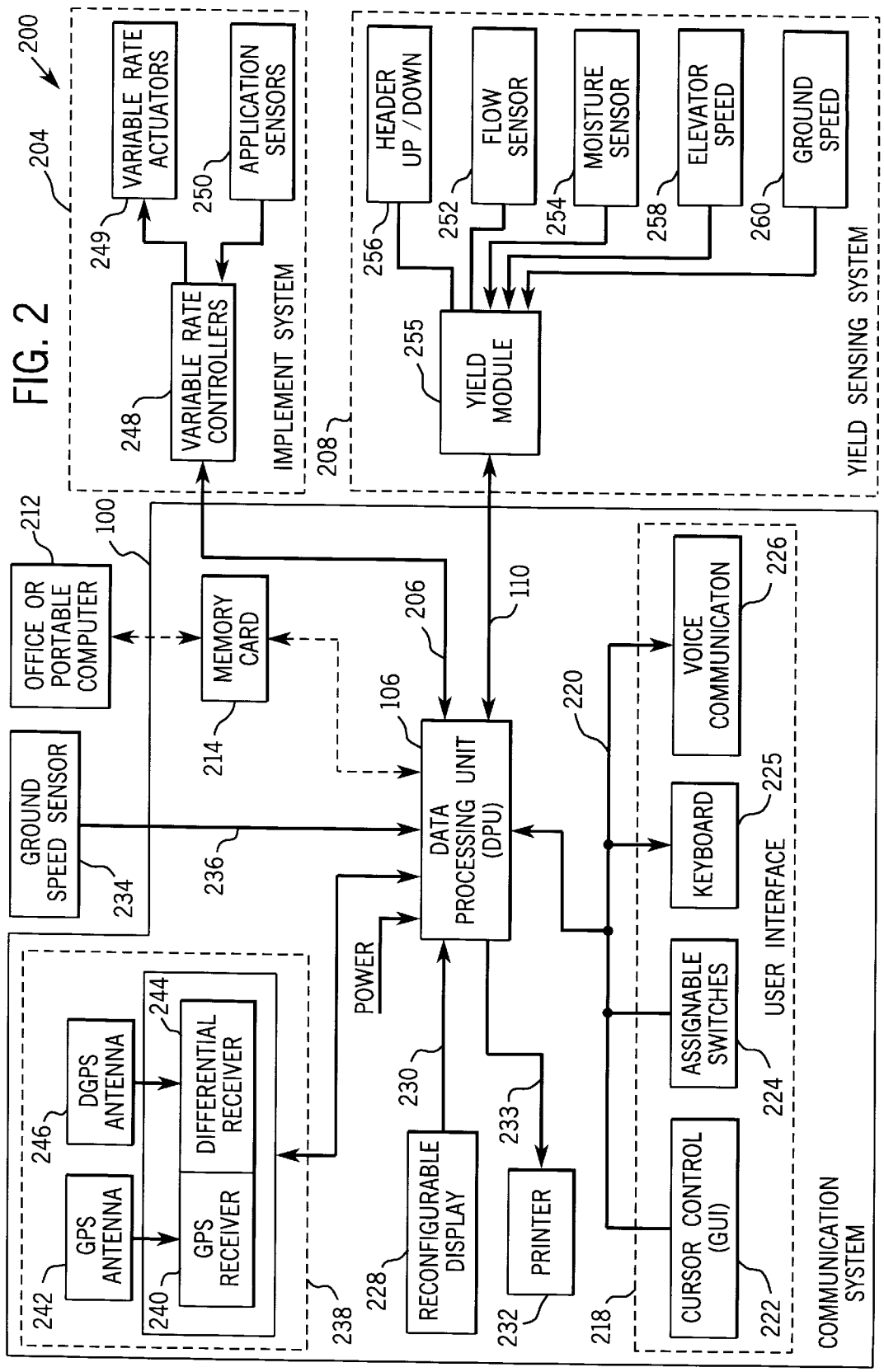
FIG. 2 is a block diagram generally representing a preferred embodiment, in which the communication system depicted in FIG. 1 is applied in a farming system including vehicles equipped with sensors for sampling characteristics within a geographical area and an electronic display for displaying to a vehicle operator visible indicia of the locations of the vehicle in combination with the field characteristics and message information related to the area.

Referring now to FIG. 2, a preferred embodiment of communication system 100 is illustrated in the context of a site-specific farm system 200. Farm system 200 preferably includes one or more communication systems 100 which provide data processing functions for one or more vehicles 10, such as tractors or combines, which are moving within a geographical area. In a typical farming system 200, each vehicle 10 is equipped with its own communication system 100. If mounted in a tractor, communication system 100 transmits and receives data over bus 206 which is coupled to an implement system 204 appropriate for the task at hand. Similarly, if mounted in a combine, communication system 100 transmits and receives data over bus 210 which is coupled to a yield sensing system 208. Data collected via bus 206 or 210 is processed and correlated with location data representative of the locations of vehicle 10 and message data related to the geographical area. The data is communicated to the vehicle operator via a communication device, such as a reconfigurable display 228.

Preferably, communication system 100 is removable and can be installed on a variety of agricultural or construction vehicles. When installed on a tractor equipped with implement system 204, communication system 100 can be configured to operate in an "apply" mode in which it collects, controls, records and displays application rate data. The displayed data may include either the desired application rate data (e.g., the prescription map) or the actual application rate data (e.g., the sensed feedback). When installed on a combine equipped with yield sensing system 208, communication system 100 can be configured to operate in a "harvest" mode in which it collects, records and displays harvest data (e.g., yield or moisture content). Communication system 100 may also operate in a "scout" mode in which it records and displays data observed and entered by an operator. Communication system 100 may also provide directional or positional assistance during scouting or when collecting soil samples. Sensing and control functions that require specialized input and output processing are performed outside communication system 100.

Farming system 200 also includes a workstation or personal computer 212 which may be either portable or located in the farm office. A data medium is used to transfer site-specific data between communication system 100 and computer 212. Preferably, communication system 100 and computer 212 each include a read/write interface (not shown) for a removable memory card 214 which can be transported between communication system 100 and computer 212. Memory card 214 may be a Type II PCMCIA memory card made by Centennial Technologies, Inc. However, other data media may be used, such as floppy or hard disks, RF, infrared, or cables carrying RS-232/485 signals. Memory card 214 is used to transfer site-specific characteristic data from communication system 100 to computer 212, and to transfer prescription maps from computer 212 to communication system 100.

Communication system 100 includes DPU 106 which communicates with the vehicle operator through a user interface 218 via links 220 (e.g., an RS-232/485 interface; a standard keyboard interface). DPU 106 includes a processor (e.g., a 486DX or Pentium® microprocessor), a display control circuit, and various types of memory which may include non-volatile memory (PROM, EEPROM, or FLASH) and volatile memory (RAM). The processor is configured to execute a program stored in the non-volatile memory and the volatile memory may include a battery back-up circuit. Alternatively, DPU 106 may be implemented using dedicated, specific purpose equipment or hard-wired logic circuitry. User interface 218 includes a graphical user interface (GUI) 222 which provides cursor control (e.g., a mouse, joystick, or four-way switch with up, down, right, and left positions), assignable switches 224 configurable by the processor, a keyboard 225, and a voice communication interface 226.

The display control circuit included in DPU 106 is configured to generate display signals which are applied to reconfigurable display 228 (e.g., a CRT, flat screen LCD display) via a communication link 230. Display 228 is preferably an active-matrix LCD capable of displaying full-motion video and a number of colors under varying ambient light conditions. Display 228 is capable of displaying graphics and alphanumeric characters. Display 228 is used to display the current configurations of assignable switches 224. DPU 106, user interface 218, and display 228 are located in the cab of vehicle 10 such that the operator has easy access to user interface 218 and an unobstructed view of display 228. Communication system 100 may also include a printer 232 in the cab which communicates with DPU 106 via an interface 233 (e.g., an RS-232 link). In alternative embodiments, DPU 106 may include a control circuit configured to generate control signals for application to other types of communication devices, such as devices which include a speaker for audibly communicating all or a portion of the information to the vehicle operator.

DPU 106 receives signals representing the speed of the vehicle from a ground speed sensor 234 via an interface 236 (e.g., a frequency interface). Ground speed sensor 234 may include a magnetic pickup sensor configured to sense the speed of the vehicle's wheels or transmission, or may include a radar device mounted to the body of the vehicle. The speed signals may be used by DPU 106 to calculate distance travelled.

DPU 106 also communicates with a data generator 238 which generates location and message data representing the location of vehicle 10 and the message information, respectively. Generator 238 preferably includes a global positioning system (GPS) signal receiver 240 with an associated antenna 242, and a message and differential GPS (DGPS) signal receiver 244 with an associated antenna 246. Alternatively, a single antenna may be used in place of antennae 242 and 246, or multiple antennae may be used in place of antenna 246. GPS receiver 240 may, for example, be manufactured by Trimble Navigation Ltd. of California, and message and DGPS receiver 244 may be manufactured by Satloc, Inc. of Arizona.

GPS receiver 240 determines longitude and latitude coordinates and elevation of vehicle 10 from signals transmitted by the GPS satellite network. The accuracy of the position data is improved by applying correction signals received by message and DGPS receiver 244. The differential correction signals are used to correct errors present on GPS signals including the selective availability error signal added to GPS signals by the U.S. government. DGPS correction signals are transmitted by the U.S. Coast Guard and by commercial services. For example, the Omnistar DGPS system from John E. Chance & Assoc. of Texas includes a network of ten land-based differential reference stations which send correction signals to a master station which uploads signals to a satellite for broadcast throughout North America. GPS differential correction signals may also be transmitted from a local base station such as the top of a farm building. In a preferred embodiment, DPU 106 interfaces with the SAT-LOC L-Band Integrated TerraStar DGPS system via an RS-485 communication link.

In the preferred embodiment, the message signal (e.g., a regional weather map, emergency information, or a commodities report) is integrated (e.g., multiplexed) with the DGPS signal and transmitted to communication system 100 by the DGPS signal provider. Alternatively, the DGPS signal may be transmitted to a local base station, such as the farm office, where the DGPS signal is combined with the message signal and then transmitted to system 100. In such a system, the message signal transmitted from the farm office may include information such as a soil sampling map (indicating nutrient content at various locations in a field) or a scouting map (indicating weed, landmark, and obstacle locations).

Soil sampling and scouting maps may be generated from data gathered during previous excursions over the field being worked. For example, a vehicle may be equipped with GPS and DGPS receivers and a soil sampling apparatus configured to obtain soil samples as the vehicle traverses the field, package the samples in individual containers (e.g., plastic bags), and bar-code each container with location information received by the GPS/DGPS receivers. The packaged and coded samples may later be analyzed for nutrient content at a remote laboratory. A soil sampling map may be generated that correlates the recorded location information and the results of the soil analysis. The map may then be stored as digital data that may later be transmitted in the message signal. Similarly, a scouting map may be generated from data gathered by a vehicle equipped with GPS/DGPS receivers and a marking apparatus. As the vehicle moves through the field, the marking apparatus may be used to mark the location of various items of interest, such as weeds, landmarks, and obstacles. The generated map may then be stored as digital data for later transmission in the message signal.

As a further alternative, two-way communication may be established between vehicle 10 and the farm office, and other types of message information may be relayed. For example, communication from vehicle 10 to the farm office may indicate the positions of vehicle 10 within the field. The farm office may respond with a message signal indicating the amount of remaining acreage to be worked in the field.

Referring again to FIG. 2, when communication system 100 is mounted on a tractor, DPU 106 communicates with implement system 204 via bus 206. Implement system 204 may include one or more variable-rate controllers 248, variable-rate actuators 249, and application sensors 250. DPU 106 reads application rate data for a particular location in the field from a prescription map (which may be supplied by computer 212), or reads an input device such as a potentiometer (not shown) used to manually set a desired application rate, and generates commands which are transmitted to variable-rate controllers 248. The command output rate is a function of the speed of the tractor and the desired application rate. For example, an increased speed will require an increased output rate to maintain a constant desired application rate. In response, variable-rate controllers 248 generate control signals which are applied to variable-rate actuators 249. Application sensors 250 provide feedback signals to enable closedloop control over application rates. Variable-rate application systems include, for example, a variable-rate planter controller. Bus 206 may be an RS-485 bus for a single-channel variable-rate controller, or a J-1939 implement bus for a multiple-channel controller.

Vehicle 10 may also include site-specific sensors which sense characteristics of a field during field operations and communicate the information to DPU 106, even if vehicle 10 is not equipped with variable-rate controllers 248. For example, a tractor pulling a plow may be equipped with sensors for monitoring site-specific characteristics, such as draft force, implement position or ground compaction, as a field is worked. A tractor with a hitch assembly control system with various sensors is described in U.S. Pat. No. 5,421,416, commonly assigned and incorporated herein by reference. A tractor, as used herein, includes various agricultural vehicles including or attached to planters and material spreaders (e.g., a fertilizer spreader).

When communication system 100 is mounted on a combine, DPU 106 communicates with yield sensing system 208 via link 210, which may carry RS-232/485 signals. Yield sensing system 208 typically includes a yield flow sensor 252 and a moisture sensor 254. Yield flow sensor 252 may include an impact-type mass flow rate sensor attached to a steel plate which is struck by grain passing through the clean-grain elevator of the combine to measure the force of the grain flow. Moisture sensor 254 may be a capacitive-type sensor mounted on the underside of the grain tank loading auger of the combine to measure the moisture content of grain passing near the sensor. Moisture sensor 254 may include a grain temperature sensor to compensate the grain moisture signals for temperature. DPU 106 receives sensed signals from flow sensor 252 and moisture sensor 254 and also receives location signals from data generator 238 which represent the position of the combine where the grain flow and moisture content were sampled. The grain flow and moisture content signals are processed to form data representative of the respective characteristic, and this data is correlated with location data representative of the location signals as well as message data representative of the message signal. Correlated data is stored in memory card 214 or in another memory. In addition to yield and moisture content, many other sensors which monitor or sample site-specific characteristics may be used as well.

To convert the grain flow signals into yield data, the distance travelled by the combine is determined by multiplying the combine's speed by elapsed time. The speed may be based upon signals sensed by speed sensor 234, or may be determined by calculating the difference between successive position signals received from data generator 238 and dividing by elapsed time. The yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance travelled.

In one embodiment, DPU 106 receives RS-485 serial communication signals from a yield module unit (YMU) 255 which is configured to perform data processing for yield sensing system 208. Using a separate YMU off-loads data processing functions from DPU 106, and minimizes wiring between the combine and the DPU. YMU 255 receives sensed signals from flow sensor 252, moisture sensor 254, a header up/down sensor 256, an elevator speed sensor 258 and a ground speed sensor 260. Header up/down sensor 256 senses the position of the combine's header to detect whether the combine is harvesting. When header position is above a pre-programmed value, YMU 255 assumes the combine is not harvesting and yield information is not calculated. A system for controlling and displaying the status of a combine header is described in U.S. Pat. No. 5,465,560, commonly assigned and incorporated herein by reference. Elevator speed sensor 258 senses the speed of the clean grain elevator to determine the speed at which grain passes through the elevator. Signals from sensor 258 may be used to compensate the yield calculations for the delay before harvested grain is sensed. Ground speed sensor 260 senses ground speed of the combine, and may be the same as ground speed sensor 234, or similar to it.

YMU 255 uses signals from sensors 252, 254, 256, 258, and 260 to calculate and communicate yield and moisture content data to DPU 106 via bus 210. The update rate at which data is communicated may be once per second. YMU 255 may provide instantaneous yield and moisture content data, and may also provide field and load total (summary) values for grain weight, wet and dry bushels, average moisture, area harvested and dry yield. Thus, YMU 255 allows specific yield processing functions to be moved from DPU 106. Alternatively, YMU 255 may send raw sensed data to DPU 106 and DPU 106 may perform the calculations. However, farming system 200 could also be configured such that DPU 106 reads the signals directly from the sensors.

Communication system 100 may communicate with other vehicle systems over a vehicle data bus (not shown). Preferably, the vehicle data bus conforms to the standards of SAE J-1939 ("Recommended Practice for a Serial Control and Communications Vehicle Network"). A bridge circuit may be used to facilitate the transfer of data between the vehicle data bus and a secondary implement bus coupled to implement system 204 and DPU 106. The bridge circuit may be used to filter data between busses, thereby decreasing bus loading.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, although communication system 100 has been described in the context of site-specific farming, system 100 also may be mounted in a construction vehicle, such as an excavator or grader. In a construction application, system 100 may relay message and/or other information related to the construction site, such as obstacle locations, regional weather maps, excavation depths, or grading requirements, to the vehicle operator in correlation with the vehicle location information.

What is claimed is:

1. A system for communicating information related to a geographical area, the system comprising:

a vehicle moveable over the geographical area, the vehicle being configured to be operated by an operator;

a receiver supported by the vehicle which receives a location signal to identify locations of the vehicle within the area a message signal to provide message information to be mapped within the area, the location and message signals being received from at least one external source;

a data generator coupled to the receiver to generate location data representing the locations of the vehicle within the geographical area based upon the location signal and message data representing the message information related to the geographical area based upon the message signal for communication to the operator;

a data processor coupled to the data generator to process the location data and the message data, the data processor including a display control circuit to generate display signals based on the location data and the message data; and an electronic display coupled to the display control circuit to generate visible indicia in response to the display signals representative of the locations of the vehicle within the area and the message information for the area for communication to the operator, wherein the operator is provided with a simultaneous display of the locations of the vehicle and the mapped message information within the area.

2. The system of claim 1, further comprising:

a sensing circuit supported by the vehicle to generate characteristic data representative of a characteristic sampled at the locations of the vehicle within the geographical area, wherein the data processor is further coupled to the sensing circuit to correlate the location data and the characteristic data, and the display control circuit generates the display signals also based on the correlated location and characteristic data, and wherein the visible indicia are further representative of the characteristic sampled at the locations of the vehicle within the area, wherein the visible indicia provides the operator with a simultaneous display of the locations of the vehicle, the mapped message information, and the correlated characteristic data within the area.

3. The system of claim 2, wherein the vehicle is an agricultural vehicle.

4. The system of claim 3, wherein the agricultural vehicle is a combine including a grain conveyor which conveys a flow of grain.

5. The system of claim 4, wherein the sensing circuit includes a grain flow sensor supported by the combine to sense the flow of grain, and the sampled characteristic is representative of grain flow rate.

6. The system of claim 4, wherein the sensing circuit includes a moisture sensor supported by the combine to sense grain moisture, and the sampled characteristic is representative of the grain moisture.

7. The system of claim 3, wherein the sensing circuit includes a ground compaction sensor supported by the agricultural vehicle to sense the hardness of the ground, and the sampled characteristic is ground compaction.

8. The system of claim 1, wherein the receiver includes a Global Positioning System ("GPS") transducer configured to receive GPS signals from a plurality of satellites, and the data generator generates the location data based on the GPS signals.

9. The system of claim 8, wherein the receiver further includes a Differential GPS ("DGPS") receiver configured to receive a differential correction signal, and the data generator combines the GPS signals with the differential correction signal to generate the location data, the location data more accurately representing the locations of the vehicle within the geographical area than would occur without the correction signal.

10. The system of claim 1, wherein the message information to be mapped within the area for communication to the operator includes a weather map.

11. The system of claim 1, wherein the message information to be mapped within the area for communication to the operator includes at least one of a scouting map and a soil sampling map.

12. The system of claim 1, wherein the vehicle is adapted to work the area and, as the area is worked, the message information further indicates acreage remaining within the geographical area to be worked by the vehicle.

13. The system of claim 1, wherein the vehicle is a construction vehicle.

14. The system of claim 13, wherein the message information to be mapped within the area for communication to the operator includes at least one of an excavation depth, a grading requirement, and an obstacle location.

15. A system for communicating location and message information related to a geographical area, the system comprising:

a vehicle moveable over the geographical area, the vehicle being configured to be operated by an operator;

a receiver supported by the vehicle which receives a location signal from a plurality of satellites and a message signal from an external source;

a data generator coupled to the receiver to generate location data representative of locations of the vehicle within the geographical area based upon the location signal and message data representative of message information to be mapped within the geographical area based upon the message signal;

a data processor coupled to the data generator to process the location data and the message data, the data processor including a display control circuit to generate display signals based on the location data and the message data; and an electronic display coupled to the display control circuit to generate visible indicia in response to the display signals representative of the locations of the vehicle within the area and the message information for the area for communication to the operator, wherein the operator is provided with a simultaneous display of the locations of the vehicle and the mapped message information within the area.

16. The system of claim 15, further comprising:

a sensing circuit supported by the vehicle to generate characteristic data representative of a characteristic sampled at the locations of the vehicle within the geographical area, wherein the data processor is further coupled to the sensing circuit to correlate the location data and the characteristic data, and the display control circuit generates the display signals also based on the correlated location and characteristic data, and wherein the visible indicia are further representative of the characteristic sampled at the locations of the vehicle within the area, wherein the visible indicia provides the operator with a display of the locations of the vehicle, the mapped message information, and the correlated characteristic data within the area.

17. The system of claim 16, wherein the vehicle is an agricultural vehicle.

18. The system of claim 17, wherein the agricultural vehicle is a combine including a grain conveyor which conveys a flow of grain.

19. The system of claim 18, wherein the sensing circuit includes a grain flow sensor supported by the combine to sense the flow of grain and the sampled characteristic is representative of grain flow rate.

20. The system of claim 18, wherein the sensing circuit includes a moisture sensor supported by the combine to sense grain moisture, and the sampled characteristic is representative of the grain moisture.

21. The system of claim 17, wherein the sensing circuit includes a ground compaction sensor supported by the combine to sense the hardness of the ground, and the sampled characteristic is ground compaction.

22. The system of claim 15, wherein the receiver further receives a correction signal, and the data generator combines the correction signal with the location signal to generate the location data, the location data more accurately representing the locations of the vehicle within the geographical area than would occur without the correction signal.

23. The system of claim 15, wherein the message information to be mapped within the area for communication to the operator includes a weather map.

24. The system of claim 15, wherein the message information to be mapped within the area for communication to the operator includes at least one of a scouting map and a soil sampling map.

25. The system of claim 15, wherein the vehicle is adapted to work the area and, as the area is worked, the message information further indicates acreage remaining within the geographical area to be worked by the vehicle.

26. A system for communicating location and message information related to a geographical area, the system comprising:

vehicle moveable over the geographical area, the vehicle being configured to be operated by an operator;

a first receiver supported by the vehicle which receives a location signal from a plurality of satellites to identify locations of the vehicle within the area;

a second receiver supported by the vehicle which receives a combined correction and message signal from an external source, wherein the combined signal includes a correction sub-signal and a message sub-signal;

a data generator coupled to the first and second receivers to generate location data based on combining the location signal and the correction sub-signal, the location data being representative of locations of the vehicle within the geographical area, and to generate message data based on the message sub-signal, the message data being representative of the message information;

a data processor coupled to the data generator to process the location data and the message data, the data processor including a display control circuit to generate display signals based on the location data and the message data; and an electronic display coupled to the display control circuit to generate visible indicia in response to the display signals representative of the locations of the vehicle in the area and the message information for communication to the operator.

27. The system of claim 26, further comprising:

a sensing circuit supported by the vehicle to generate characteristic data representative of a characteristic sampled at the locations of the vehicle within the geographical area, wherein the data processor is further coupled to the sensing circuit to correlate the location data and the characteristic data, and the display control circuit generates the display signals also based on the correlated location and characteristic data, and wherein the visible indicia are further representative of the characteristic sampled at the locations of the vehicle within the area, wherein the visible indicia provides the operator with a simultaneous display of the locations of the vehicle, the message information, and the correlated characteristic data.

28. The system of claim 27, wherein the vehicle is an agricultural vehicle.

29. The system of claim 28, wherein the agricultural vehicle is a combine including a grain conveyor which conveys a flow of grain, the sensing circuit including a grain flow sensor supported by the combine to sense the flow of grain, and the sampled characteristic is representative of grain flow rate.

30. The system of claim 26, wherein the message information is related to the area.

31. The system of claim 26, wherein the external source is a DGPS signal provider, and the combined correction and message signal was formed by the DGPS signal provider by integrating a message signal and a differential correction signal.

32. The system of claim 26, wherein the external source is a local base station, and the combined correction and message signal was formed by the local base station by integrating a message signal and a differential correction signal, the differential correction signal being received by the base station from a DGPS signal provider.

33. The system of claim 26, wherein the message information includes at least one of a weather map and a commodities report.

34. The system of claim 26, wherein the message information includes at least one of a soil sampling map and a scouting map.

35. The system of claim 26, wherein the vehicle is adapted to work the area and, as the area is worked, the message information indicates acreage remaining within the geographical area to be worked by the vehicle.

36. A system for communicating location and message information related to a geographical area, the system comprising:

a vehicle moveable over the geographical area, the vehicle being configured to be operated by an operator;

a first receiver supported by the vehicle to receive a location signal from a plurality of satellites to identify locations of the vehicle within the area;

a second receiver supported by the vehicle which receives a combined correction and message signal from an external source, wherein the combined signal includes a correction sub-signal and a message sub-signal;

a data generator coupled to the first and second receivers to generate location data based on combining the location signal and the correction sub-signal, the location data being representative of locations of the vehicle within the geographical area, and also to generate message data based on the message sub-signal, the message data being representative of the message information;

a data processor coupled to the data generator to process the location data and the message data, the data processor including a control circuit to generate control signals based on the location data and the message data; and a communication device coupled to the control circuit to generate indicia in response to the control signals representative of the locations of the vehicle within the area and the message information for communication to the operator.

37. The system of claim 36, further comprising:

a sensing circuit supported by the vehicle to generate characteristic data representative of a characteristic sampled at the locations of the vehicle within the geographical area, wherein the data processor is further coupled to the sensing circuit to correlate the location data and the characteristic data, and the control circuit generates the control signals also based on the correlated location and characteristic data, and wherein the indicia are further representative of the characteristic sampled at the locations of the vehicle within the area.

38. The system of claim 37, wherein the vehicle is an agricultural vehicle.

39. The system of claim 38, wherein the agricultural vehicle is a combine including a grain conveyor which conveys a flow of grain, the sensing circuit including a grain flow sensor supported by the combine to sense the flow of grain, and the sampled characteristic is representative of grain flow rate.

40. The system of claim 36, wherein the message information is mapped within the area.

41. The system of claim 36, wherein the external source is a DGPS signal provider, and the combined correction and message signal was formed by the DGPS signal provider by integrating a message signal and a differential correction signal.

42. The system of claim 36, wherein the external source is a local base station, and the combined correction and message signal was formed by the local base station by integrating a message signal and a differential correction signal, the differential correction signal being received by the base station from a DGPS signal provider.

43. The system of claim 36, wherein the message information includes at least one of a weather map and a commodities report.

44. The system of claim 36, wherein the message information includes at least one of a scouting map and a soil sampling map.

45. The system of claim 36, wherein the vehicle is adapted to work the area and, as the area is worked, the message information indicates acreage remaining to be worked by the vehicle within the geographical area.

46. The system of claim 36, wherein the communication device includes a speaker and the indicia includes an audible portion.

47. A system for communicating location and message information related to a geographical area, the system comprising:

a vehicle moveable over the geographical area, the vehicle being configured to be operated by an operator;

first receiving means for receiving a location signal from a plurality of satellites to identify locations of the vehicle within the area;

second receiving means for receiving a combined correction and message signal from an external source, wherein the combined signal includes a correction sub-signal and a message sub-signal;

data generating means for generating location data based on combining the location signal and the correction sub-signal, the location data being representative of locations of the vehicle within the geographical area, and also for generating message data based on the message sub-signal, the message data being representative of the message information;

processing means for processing the location data and the message data, the processing means including control means for generating control signals based on the location data and the message data; and communication means for generating indicia based on the control signals, the indicia including representations of the locations of the vehicle in the area and the message information for communication with the operator.

48. The system of claim 47, further comprising:

characteristic means for generating characteristic data representative of a characteristic sampled at the locations of the vehicle within the geographical area, wherein the processing means further correlates the location data and the characteristic data, and the control means generates the control signals also based on the correlated location and characteristic data, and wherein the indicia further includes representations of the characteristic sampled at the locations of the vehicle within the area.

49. The system of claim 48, wherein the vehicle is an agricultural vehicle.

50. The system of claim 49, wherein the agricultural vehicle is a combine including a grain conveyor which conveys a flow of grain, the characteristic means including grain flow sensing means for sensing grain flow, and the sampled characteristic being representative of grain flow rate.

51. The system of claim 47, wherein the message information is mapped in the area.

52. The system of claim 47, wherein the external source is a DGPS signal provider, and the combined correction and message signal was formed by the DGPS signal provider by integrating a message signal and a differential correction signal.

53. The system of claim 47, wherein the external source is a local base station, and the combined correction and message signal was formed by the local base station by integrating a message signal and a differential correction signal.

54. The system of claim 47, wherein the message information includes at least one of a weather map and a commodities report.

55. The system of claim 47, wherein the message information includes at least one of a scouting map and a soil sampling map.

56. The system of claim 47, wherein the vehicle is adapted to work the area and, as the area is worked, the message information indicates acreage remaining to be worked by the vehicle within the geographical area.

57. The system of claim 47, wherein the communication means includes a speaker and the indicia includes an audible portion.

58. The system of claim 47, wherein the vehicle is a construction vehicle.

59. The system of claim 58, wherein the message information includes at least one of an excavation depth, a grading requirement, and an obstacle location.

60. A method for communicating location and message information related to a geographical area to an operator housed in a vehicle, the method comprising the steps of:

moving the vehicle over the geographical area;

receiving a location signal from a plurality of satellites to identify locations of the vehicle within the area;

receiving a combined correction and message signal from an external source;

de-multiplexing the combined correction and message signal into a correction sub-signal and a message sub-signal;

generating location data based on combining the location signal and the correction sub-signal, the location data being representative of locations of the vehicle within the geographical area;

generating message data based on the message sub-signal, the message data being representative of the message information;

generating control signals based on the location data and the message data; and generating a communication based on the control signals, the communication being perceptible by the operator and representative of the locations of the vehicle within the area and the message information.

61. The method of claim 60, further comprising the steps of:

generating characteristic data representative of a characteristic sampled at the locations of the vehicle within the geographical area;

correlating the location data with the characteristic data;

generating the control signals also based on the correlated location and characteristic data; and generating a communication representative of the characteristic sampled at the locations of the vehicle within the area, the communication being perceptible to the operator.

62. The method of claim 61, wherein the vehicle is an agricultural vehicle.

63. The method of claim 62, wherein the agricultural vehicle is a combine including a grain conveyor which conveys a flow of grain, and the method further comprises the step of sensing grain flow rate as the characteristic.

64. The method of claim 60, wherein the message information is related to the area.

65. The method of claim 60, wherein the external source is a DGPS signal provider, and the combined correction and message signal was formed by the DGPS signal provider by integrating a message signal and a differential correction signal.

66. The method of claim 60, wherein the message information includes at least one of a weather map and a commodities report.

67. The method of claim 60, wherein the message information includes at least one of a scouting map and a soil sampling map.

68. The system of claim 60, wherein the vehicle is adapted to work the area and, as the area is worked, the message information indicates acreage remaining to be worked by the vehicle within the geographical area.

69. The method of claim 60, wherein at least a portion of the message information is audibly perceptible.

70. The method of claim 60, wherein the vehicle is a construction vehicle.

71. The method of claim 70, wherein the message information includes at least one of an excavation depth, a grading requirement, and an obstacle location.

* * * * *

UNITED STATES PATENT AND TRADEMARK OFFICE
CERTIFICATE OF CORRECTION

PATENT NO. : 5,991,687
DATED : November 23, 1999
INVENTOR(S) : George H. Hale; Andrew P. Milleville; Alan D. Berger It is certified that error appears in the above-identified patent and that said Letters Patent is hereby corrected as shown below:

In claim 1, column 8, line 26, insert --and-- after "area".

In claim 19, column 10, line 30, insert --,-- after "grain".

In claim 26, column 10, line 60, insert --a-- before the first occurrence of "vehicle".

Signed and Sealed this

Twenty-third Day of May, 2000

Attest:

Q. TODD DICKINSON

*Attesting Officer*   *Director of Patents and Trademarks*